United States Patent Office 2,975,146
Patented Mar. 14, 1961

2,975,146

METHOD FOR PREPARING POLYURETHANE CELLULAR PRODUCTS

Thomas H. Rogers, Jr., and Donald W. Peabody, Akron, Ohio, assignors to The Goodyear Tire & Rubber Company, Akron, Ohio, a corporation of Ohio No Drawing. Filed Feb. 18, 1957, Ser. No. 640,621

2 Claims. (Cl. 260—2.5)

This invention relates broadly to methods for preparing flexible elastomeric cellular materials. More particularly, it relates to methods for preparing flexible elastomeric cellular polyurethane products formed from liquid reaction mixtures containing polyisocyanates and active-hydrogen containing polymeric materials and to the improved products obtained by the use of these methods.

The production of flexible elastomeric cellular polyurethane materials is known. The reaction mixtures from which the cellular products are made contain polymeric materials which are either liquid at room temperature or capable of being melted at rather low temperatures. The polymeric materials contain active-hydrogen atoms which react with isocyanate groups to extend the molecular chains. The polyisocyanate reactant performs a three-fold function in the reaction mixture. It operates to extend the chain length of the polymeric material, to react with the water in the formation of carbon dioxide gas and to cross-link or cure the chain-extended polymeric material. The carbon dioxide that is liberated by the reaction produces a foamed mixture which sets to an elastomeric flexible cellular structure after cure.

By the term "active-hydrogen" used to describe the polymeric material is meant those hydrogen atoms which are reactive as measured and determined by the Zerewitinoff method. Examples of active-hydrogen containing polymeric materials used in preparing the polyurethane cellular products are polyesters, polyesteramides, polyalkylene ether glycols and mixtures of two or more of these.

The polyesters are prepared by the condensation of one or more glycols with one or more dibasic carboxylic acids. Polyesteramides are prepared from one or more glycols, one or more dibasic carboxylic acids and relatively small amounts of one or more bifunctional amino compounds such as amino carboxylic acids, amino alcohols and diamines. Small amounts of trifunctional materials such as citric acid or glycerol may also be employed in the preparation of the polyesters and polyesteramides. The polyalkylene ether glycols are hydroxyl-terminated polyethers derived from alkylene oxides or glycols or from heterocyclic ethers, such as dioxolane. Further examples of these active-hydrogen-containing materials and methods for their preparation are described in U.S. Patents 2,625,531, 2,625,532, and 2,625,535 which describe the preparation of polyesteramides and polyesters, and U.S. Patents 2,674,619 and 2,692,873 which describe the preparation of polyalkylene ether glycols. Preferred active-hydrogen containing materials useful in the practice of this invention are the polyalkylene ether glycols or polyesters having an average molecular weight of from approximately 1000 to 5000, an acid number not greater than 5, and a hydroxyl number from 20 to 110. Best results are obtained with a polyalklene ether glycol or a polyester or mixtures thereof having an average molecular weight of approximately 2,000.

Any organic polyisocyanate or mixtures of polyisocyanates may be employed in preparing the polyurethane foams. The amount of polyisocyanate should be at least sufficient to cross-link the active-hydrogen containing polymeric material and to react with the water present to generate carbon dioxide gas. In general it is preferred to use from 2 to 8 equivalents of isocyanate per mol of polymeric material with best results being obtained by the use of approximately 3 mols of a diisocyanate per mol of polymeric material. Representative examples of polyisocyanates which may be employed are the diisocyanates such as hexamethylene diisocyanate; para-phenylene diisocyanate; meta-phenylene diisocyanate; 4,4'-diphenylene diisocyanate; 1,5-naphthalene diisocyanate; 4,4'-diphenylene methane diisocyanate; the tolylene diisocyanates; 4.4'-diphenyl ether diisocyanate; 3,3'-dimethyl 4,4'-diphenyl diisocyanate; and 3,3'-dimethoxy 4,4'-diphenyl diisocyanate; the triisocyanates such as 4,4',4''-triphenyl methane triisocyanate; and toluene 2,4,6-triisocyanate; the tetraisocyanates such as 4,4'-dimethyl-diphenyl methane 2,2',5,5'- tetraisocyanate and mixtures of polyisocyanates such as those described in U.S. Patent 2,683,730. Of these the tolylene diisocyanates, such as 2,4 tolylene diisocyanate and 2,6 tolylene diisocyanate (or mixtures thereof) and toluene 2,4,6 triisocyanate are particularly preferred.

The water in the reaction mixture is provided to generate the carbon dioxide gas for foaming as well as to form possible points for cross-linking the polymeric material. While the amount of water employed in the reaction mixture may be varied, it has been observed that best results are obtained by employing an amount of water on a mol basis approximately equivalent to, and preferably from 0.1% to 10% less than, the difference between the mols of isocyanate employed and the mols of polymeric material employed. This amount of water is approximately equal to the "free" isocyanate which remains after the active-hydrogen atoms of the polymeric material are satisfied. In addition to the three essential ingredients (polymer, polyisocyanate and water) the reaction mixture may optionally contain pigment fillers, reinforcing agents, coloring agents, antioxidants and catalysts.

Since the reaction mixture is liquid at the time when the carbon dioxide gas is generated to produce the desired cellular structure, control of the generation of the carbon dioxide gas so as to minimize shrinkage and collapse of the cured cellular product is necessary. The polymeric material in the reaction mixture is a viscous liquid which, as the chain extension and cross-linking reactions proceed, progressively become more viscous until finally it forms the solid network for the resilient cellular finished product. If the generation of the carbon dioxide occurs before the polymeric material becomes sufficiently viscous and before it possesses sufficient internal strength, the generated gas will escape from the reaction mixture and shrinkage or collapse of the cured material will result. This shrinkage or collapse results in a product having non-uniform density and a relatively thick skin of non-porous material on the surface. If, on the other hand, the gas is generated late in the course of the reaction, at which time chain-extension and cross-linking is well advanced, the polymeric material has become too tough to be readily expanded or blown, with the result that the late-evolved gas diffuses through the mass and escapes to leave a finished material of low porosity and very high density.

In producing polyurethane cellular products tertiary amines or another type of activator is conventionally employed to increase the rate of cure of the reaction mixture. It has been generally observed that an increase in the amount of activator present provides an increase in the rate of cure. However, the activator also has a catalytic effect upon the reaction between the isocyanate and the water present with the result that the rate of foaming of the reaction mixture increases. This increased rate of foaming will, if the reaction mixture does not contain sufficient internal strength, cause collapse of the foamed mixture and coarseness in the cured product.

It is the broad object of this invention to provide methods for accelerating the cure of polyurethane cellular materials. Another object is to provide such acceleration without adversely affecting the quality of the cellular material. Another object is to reduce the length of time required to set the polyurethane firmly so that more economical use can be made of the molds into which the reaction mixture is poured. Still another object is to improve the flame resistance of the polyurethane cellular products. Other objects will appear as the description proceeds.

The objects of this invention are accomplished by curing the reaction mixture containing polyisocyanate, water and the active-hydrogen containing polymeric material in the presence of urea, thiourea or biuret. It has been observed that the presence of one or more of these activators in the reaction mixture increases the rate of the exothermic reactions involved with the result that the temperature of the reaction mixture increases. The increased temperature causes the mixture to set in a shorter time.

The amount of activator employed in the practice of this invention is not critical, amounts in the range of from 0.50 to 5.0 parts by weight per 100 parts by weight of the active-hydrogen containing polymeric material having been found to be satisfactory. The urea, thiourea or biuret may be added to the liquid active-hydrogen containing polymeric material, or to the complete reaction mixture or it may be mixed with one or more of the other reactants or ingredients and added to the polymeric material. Regardless of how the activator is added the desired results are obtained by the presence of the activator in the curing reaction mixture.

The urea, thiourea or biuret may be employed alone or in combination with other activators such as N-methyl morpholine, N-ethyl morpholine, triethylamine and the amine/aldehyde condensation products described in United States Patents 1,780,326 and 1,780,334.

The practice of this invention is further illustrated by the following examples which are representative rather than restrictive of the scope of the invention. Unless otherwise specified parts are shown by weight.

EXAMPLE 1

A polyester (100 parts) prepared from diethylene glycol and adipic acid and having an average molecular weight of approximately 1800 and an acid number of 1.5 was mixed with 1 part of an emulsifier (polyoxyethylated vegetable oil sold as Emulfor EL-719 by the Antara Chemicals Division of General Aniline and Film Corp.), 2.7 parts of water and 1 part of N-methyl morpholine. The mixture was thoroughly blended and 34.5 parts of a mixture of tolylene diisocyanates containing 80% by weight of the 2,4 isomer and 20% by weight of the 2,6 isomer was added. The complete mixture was stirred thoroughly and poured into a mold equipped with a thermometer. The initial temperature of the foaming mixture was 23° C. After seven minutes the temperature had risen to a maximum temperature of 84° C.

EXAMPLE 2

The same procedure was followed as in Example 1 except that 1 part of urea was added to the reaction mixture. In this sample the original temperature of the foaming reaction mixture was 24° C. while the maximum temperature, reached after 7 minutes, was 90° C.

EXAMPLE 3

The same procedure was followed as in Example 1 except that 2 parts of urea were added to the reaction mixture. The initial temperature of the foaming reaction mixture was 23° C. while the maximum temperature, reached after 8 minutes, was 102° C.

As evidenced by the greater temperature increases in the reaction mixtures of Examples 2 and 3, the presence of urea in the mix increases the rate of the exothermic reactions involved. This higher temperature increases the curing rate of the mix permitting the final cured product to be removed from the mold in a shorter time.

EXAMPLE 4

A polyester (100 parts) prepared from diethylene glycol and adipic acid and having an average molecular weight of approximately 1800 and an acid number of 2.4 was mixed with 1.5 parts of an emulsifier (polyoxyethylated vegetable oil sold as Emulfor El 719), 4.0 parts of tricresyl phosphate, 0.5 part of hexanetriol, 2.7 parts of water and 1 part of N-ethyl morpholine. The mixture was thoroughly blended and 36.5 parts of a mixture of tolylene diisocyanates containing 80% by weight of the 2,4 isomer and 20% by weight of the 2,6 isomer was added. The complete mixture was stirred thoroughly and poured into a mold equipped with a thermometer. The initial temperature of the foaming mixture was 28° C. After 7 minutes the temperature had risen to a maximum of 79° C.

EXAMPLE 5

The same procedure was followed as in Example 4 except that two parts of urea was added to a reaction mixture. In this sample the original temperature of the foaming reaction mixture was 27° C. while the maximum temperature, reached after 7 minutes, was 82° C.

EXAMPLE 6

The same procedure was followed as in Example 4 except that 2 parts of thiourea were added to the reaction mixture. The initial temperature of the foaming reaction mixture was 27° C. while the maximum temperature reached after 8 minutes was 83° C.

EXAMPLE 7

The same procedure was followed as in Example 4 except that 2 parts of biuret were added to the reaction mixture. The initial temperature was 27° C. while the maximum temperature, reached after 7 minutes, was 83° C.

As is evidenced by the greater temperature rise in the reaction mixtures of Examples 5 through 7, the presence of urea, thiourea or biuret in the mix increases the rate of the exothermic reactions involved. This higher temperature increases the curing rate of the mixture, permitting the final cured product to be removed from the mold in a shorter time.

Each of the samples prepared according to Examples 4 through 7 were permitted to gel at room temperature for approximately 15 minutes after which they were placed in an oven at 70° C. for one hour to complete the cure.

Physical tests were run on each of the samples prepared according to Examples 4 through 7. The results of the tests are reported in Table I below in which density is reported in pounds per cubic foot, compression values in pounds per square inch required to compress the sample 25% and 50% of its original thickness, retention of gauge in percent and hysteresis loss in percent. Retention of gauge is a measure of the percent of original thickness to which the sample returns after being compressed to 50% of its thickness in an air oven at 158° F. for 22 hours. Hysteresis loss is a measure of the energy lost in compressing the sample to 60% of its thickness and the subsequent relaxation of the sample.

Table I

| Example | Density | Compression 25% | Compression 50% | Retention of Gauge | Hysteresis Loss |
|---|---|---|---|---|---|
| 4 | 2.65 | 0.57 | 0.86 | 94.1 | 55.0 |
| 5 | 2.68 | 0.54 | 0.83 | 94.2 | 54.5 |
| 6 | 2.68 | 0.52 | 0.80 | 94.2 | 55.5 |
| 7 | 2.77 | 0.57 | 0.84 | 95.9 | 54.4 |

Samples of the cellular products of Examples 4, 5, 6 and 7 were aged for 7 days in a 158° F. oven in a humidity of from 95 to 100%. The same physical tests were run on these aged samples. The results of these aged tests are reported in Table II.

Table II

| Example | Density | Compression 25% | Compression 50% | Retention of Gauge | Hysteresis Loss |
|---|---|---|---|---|---|
| 4 | 2.64 | 0.50 | 0.76 | 92.7 | 62.8 |
| 5 | 2.65 | 0.48 | 0.76 | 93.1 | 65.5 |
| 6 | 2.73 | 0.48 | 0.78 | 94.3 | 62.0 |
| 7 | 2.79 | 0.49 | 0.78 | 93.4 | 61.4 |

From the results shown in Tables I and II it is apparent that the products prepared according to Examples 5, 6 and 7 have physical properties, both aged and unaged, comparable to the products of Example 4 prepared without the urea, thiourea or biuret activator. In addition, it has been observed that the samples prepared using the urea, thiourea or biuret have better flame resistance than samples prepared without the use of these activators.

In place of the specific polyesters, diisocyanates and other ingredients employed in the above examples, other reactants and ingredients within the scope of the teaching herein may be employed in the process of this invention.

While certain representative embodiments and details have been shown for the purpose of illustrating the invention, it will be apparent to those skilled in this art that various changes and modifications may be made therein without departing from the spirit or scope of the invention.

We claim:

1. In the process of preparing polyurethane cellular compositions from a reaction mixture containing an organic polyisocyanate, water and an active-hydrogen-containing polymeric material having an average molecular weight of from 1000 to 5000 and selected from the group consisting of polyalkylene ether glycols, polyesters prepared from at least one glycol and at least one dicarboxylic acid and polyesteramides prepared from at least one glycol, at least one dicarboxylic acid and at least one amino compound selected from the group consisting of amino carboxylic acids, amino alcohols and diamines, said polyesters and polyesteramides having an acid number not greater than 5 and an hydroxyl number of from 20 to 110, the improvement which comprises conducting the cure of said reaction mixture in the presence of an activator selected from the group consisting of urea, thiourea and biuret, the amount of said activator being from 0.50 to 5.0 parts by weight per 100 parts by weight of said active-hydrogen-containing polymeric material, the amount of said polyisocyanate providing from 2 to 8 equivalents of isocyanate per mol of polymeric material.

2. In the process of preparing polyurethane cellular compositions from a reaction mixture containing an organic polyisocyanate, water, and a polyester having an average molecular weight of from 1000 to 5000 and prepared by the reaction of at least one glycol with at least one dicarboxylic acid to give a polyester having an acid number not greater than 5 and a hydroxyl number of from 20 to 110, the improvement which comprises conducting the cure of said reaction mixture in the presence of an activator selected from the group consisting of urea, thiourea and biuret, the amount of said activator being from 0.50 to 5 parts by weight per 100 parts by weight of said polyester, and the amount of said polyisocyanate providing from 2 to 8 equivalents of isocyanate per mol of polyester.

References Cited in the file of this patent

UNITED STATES PATENTS

| 2,602,783 | Simon et al. | July 8, 1952 |
| 2,760,953 | Seeger | Aug. 28, 1956 |
| 2,841,205 | Bird | July 1, 1958 |
| 2,892,216 | Steel | June 30, 1959 |